United States Patent
Ayala et al.

(10) Patent No.: US 9,304,043 B2
(45) Date of Patent: Apr. 5, 2016

(54) MOTION DETECTION SYSTEM

(71) Applicants: Vicente Humberto Aldape Ayala, Monterrey (MX); Ricardo Alejandro Lopez Guajardo, Monterrey (MX); Javier Aldape Domene, Monterrey (MX); Alberto Aldape Domene, Monterrey (MX)

(72) Inventors: Vicente Humberto Aldape Ayala, Monterrey (MX); Ricardo Alejandro Lopez Guajardo, Monterrey (MX); Javier Aldape Domene, Monterrey (MX); Alberto Aldape Domene, Monterrey (MX)

(73) Assignee: Intelliswitch S.A. de C.V., Nuevo Leon (MX)

( * ) Notice: Subject to any disclaimer, the term of this patent is extended or adjusted under 35 U.S.C. 154(b) by 307 days.

(21) Appl. No.: 14/037,141

(22) Filed: Sep. 25, 2013

(65) Prior Publication Data
US 2015/0084517 A1    Mar. 26, 2015

(51) Int. Cl.
*G01J 5/00* (2006.01)
*G01J 5/04* (2006.01)
*G08B 13/19* (2006.01)
*G01J 5/08* (2006.01)

(52) U.S. Cl.
CPC ............ *G01J 5/0025* (2013.01); *G01J 5/04* (2013.01); *G01J 5/0806* (2013.01); *G01J 5/089* (2013.01); *G08B 13/19* (2013.01)

(58) Field of Classification Search
CPC ...... H05B 37/02; G01J 5/0025; G01J 5/0806; G01J 13/19; G01J 5/04; G01J 5/089
USPC .............. 315/152; 250/342, 349, 397, 353; 362/167, 169, 187
See application file for complete search history.

(56) References Cited

U.S. PATENT DOCUMENTS

| | | | | |
|---|---|---|---|---|
| 5,626,417 A * | 5/1997 | McCavit | ............... | F21S 8/033 250/353 |
| 6,346,705 B1 * | 2/2002 | Lee | ............... | G01J 5/0022 250/353 |
| 2007/0177384 A1 * | 8/2007 | Sibalich | ............... | F21S 8/088 362/276 |

OTHER PUBLICATIONS

"Outdoor Occupancy Sensors" by Steinel (Apr. 2011).
"IntelliDimmer, The Fluorescent Day and Night Automatic Energy Saver" by Intelliswitch S.A. de C.V. (undated).
"IntelliDimmer Specification Sheet" by Intelliswitch S.A. de C.V. (Rev. 1.4-013113).

* cited by examiner

*Primary Examiner* — Thai Pham
(74) *Attorney, Agent, or Firm* — Haynes and Boone, LLP; William B. Nash; Joseph R. Mencher

(57) ABSTRACT

A detection system includes a chassis, at least three sensors housed in the chassis, and first, second, and third lenses that are coupled to the chassis. The first lens is configured such that radiation from outside the chassis that originates from a direction that is perpendicular to the first lens is received by a first sensor over a first horizontal coverage angle of at least 120 degrees. The second lens is configured such that radiation from outside the chassis that originates from a direction that is perpendicular to the second lens is received by a second sensor over a second horizontal coverage angle of at least 120 degrees. The third lens is configured such that radiation from outside the chassis that originates from a direction that is perpendicular to the third lens is received by a third sensor over a third horizontal coverage angle of at least 120 degrees.

14 Claims, 16 Drawing Sheets

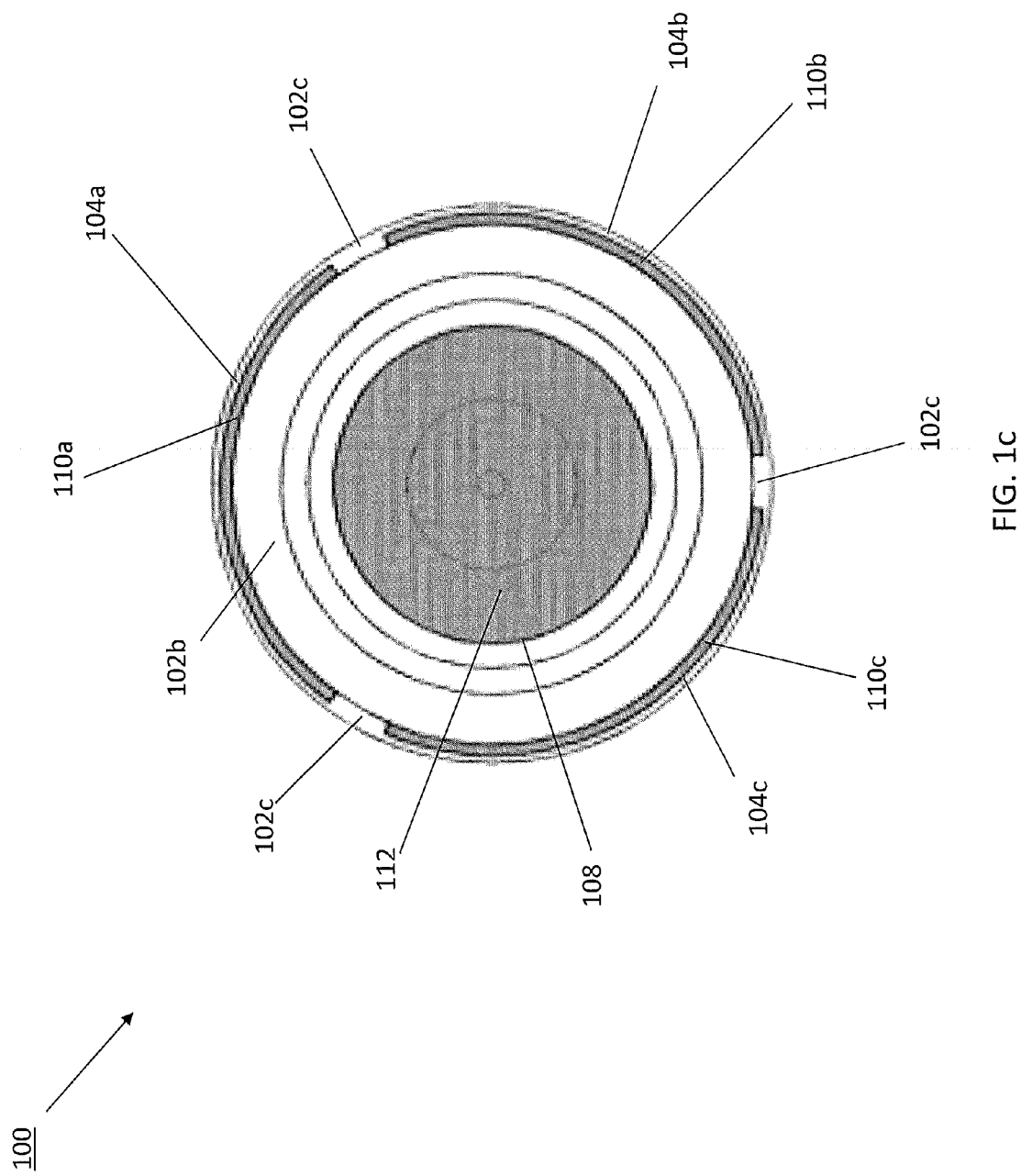

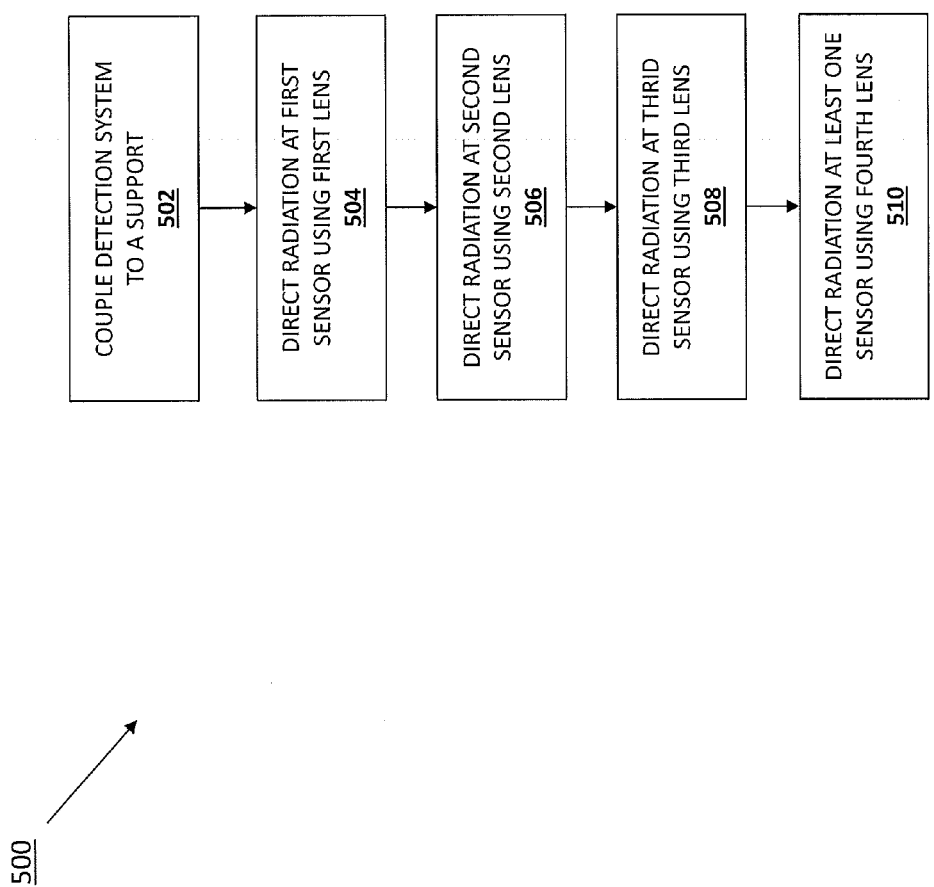

MOTION DETECTION SYSTEM

BACKGROUND

The present disclosure relates generally to detection systems, and more particularly to a motion detection system used with a power conservation system.

Lighting systems may provide the ability to reduce power consumption by, for example, turning the lighting system off, dimming the lighting components, and/or a variety of other power consumption techniques known in the art. For example, the IntelliDimmer® lighting system available from the assignee of the present disclosure, IntelliSwitch, S.A. de C.V. of Monterey, Mexico, provides a lighting system that is configured to dim the lamps of the lighting system in response to ambient light and/or detected motion. The IntelliDimmer® lighting system and similar systems may provide for energy conservation by reducing the power consumed when ambient light is sufficient and/or when the lighting system is not being used. For example, such a lighting system may reduce the power consumed by its lamps by reducing the illumination levels of the lamps by approximately 50% when no motion is detected near the lighting system. If motion is detected near the lighting system, the lighting system may then determine the ambient light condition to increase the illumination levels of the lamp up to 100% if the ambient light condition is below a predetermined level. As the ambient light condition changes (e.g., increases), the illumination level of the lamps in the lighting system may be reduced to optimize power consumption while providing a desired level of illumination. The detection of motion near the lighting system using conventional motion detection systems raises a number of issues.

Conventional motion detection systems typically may include two types of sensor devices. The first type of sensor device is a wall-mounted sensor device that includes a single sensor that provides detection coverage about a horizontal plane. Such wall-mounted sensor devices typically include a detection coverage angle of approximately 160 degrees about that horizontal plane. The second type of sensor device is a ceiling-mounted sensor device that includes a single sensor that provides detection coverage about a vertical plane. Such ceiling-mounted sensor devices typically include a detection coverage angle of approximately 160 degrees about that vertical plane. Furthermore, both wall-mounted and ceiling-mounted sensor devices suffer from the limitation that their ability to detect motion decreases at the edges of their detection coverage ranges (e.g., as the motion occurs near the 0 degree and 160 degree angle to the sensor that is located at the 80 degree point in the range.) Thus, convention detection systems require several sensor devices (wall-mounted sensor devices and ceiling-mounted sensor devices) in order to provide full coverage over any desired area (e.g., 360 degrees about a horizontal plane and 180 degrees below that horizontal plane), which increases the cost of implementing the detection system.

Accordingly, it would be desirable to provide an improved detection system.

SUMMARY

According to one embodiment, a detection system includes a chassis; at least three sensors housed in the chassis; a first lens coupled to the chassis and configured such that radiation from outside the chassis that originates from a direction that is perpendicular to the first lens is received by a first sensor of the at least three sensors over a first horizontal coverage angle of at least 120 degrees; a second lens coupled to the chassis and configured such that radiation from outside the chassis that originates from a direction that is perpendicular to the second lens is received by a second sensor of the at least three sensors over a second horizontal coverage angle of at least 120 degrees that is different from the first horizontal coverage angle; and a third lens coupled to the chassis and configured such that radiation from outside the chassis that originates from a direction that is perpendicular to the third lens is received by a third sensor of the at least three sensors over a third horizontal coverage angle of at least 120 degrees that is different from the first horizontal coverage angle and the second horizontal coverage angle.

BRIEF DESCRIPTION OF THE DRAWINGS

FIG. 1c is a bottom view illustrating an embodiment of the detection system of FIG. 1a;

FIG. 1e is an internal view illustrating an embodiment of the detection system of FIG. 1a;

FIG. 5 is a flow chart illustrating an embodiment of a method for detecting motion;

DETAILED DESCRIPTION

Figure 1A:
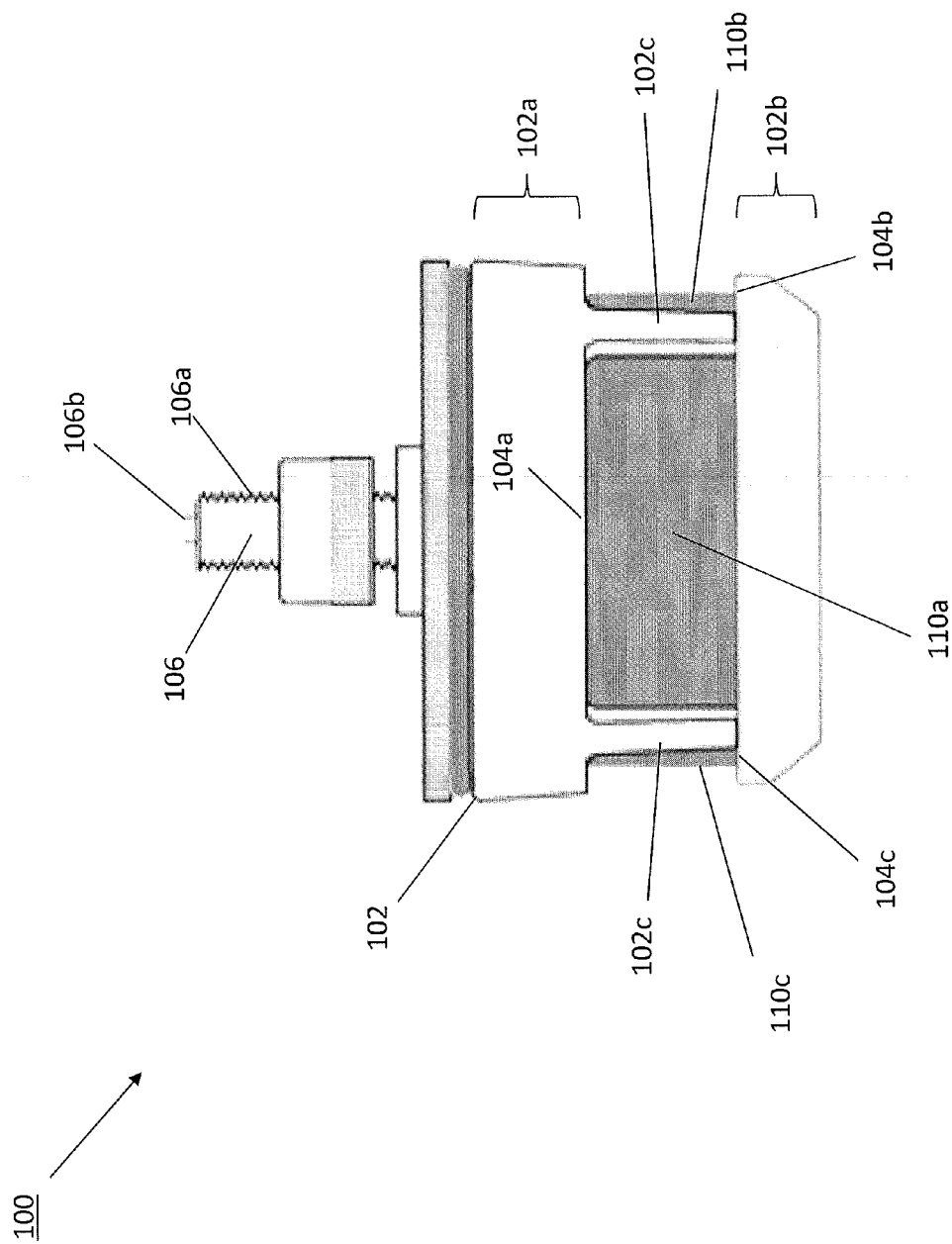
FIG. 1a is a side view illustrating an embodiment of a detection system.

Referring initially to FIGS. 1a, 1b, 1c, 1d, and 1e, an embodiment of a detection system 100 is illustrated. In the embodiments illustrated and discussed below, the detection system 100 is described as a ceiling-mounted detection system used to provide motion detection for a lighting power conservation system. However, one of skill in the art in possession of the present disclosure will recognize that the teachings of the present disclosure may be applied to different mounting orientations of the detection system (e.g., wall mounting, floor mounting, etc.), different types of detection other than motion, and/or different uses of the detection results (e.g., alarm security systems, video recording security systems, etc.) will fall within the scope of the present disclosure.

The detection system 100 includes a chassis 102 that includes a base section 102a separated from a cap section 102b by a plurality of arms 102c that define a plurality of generally rectangular arcuate lens windows 104a, 104b, and 104c between the base section 102a, the cap section 102b, and the arms 102c. A connector 106 extends from the base section 102a and, in the embodiment discussed below, is a ceiling connector that includes a threaded outer surface 106a and that may define a cylindrical channel for routing wire 106b from components of the detection system 100, discussed in further detail below. The cap section 102b defines a lens window 108 that is oriented substantially perpendicularly to the lens windows 104a, 104b, and 104c.

FIGS. 1a and 1c illustrated the detection system 100 with a plurality of lenses positioned in the lens windows: a generally rectangular arcuate first lens 110a is positioned in the lens window 104a, a generally rectangular arcuate second lens 110b is positioned in the lens window 104b, a generally rectangular arcuate third lens 110c is positioned in the lens window 104c, and a generally concave fourth lens 112 is positioned in the lens window 108. The base section 102a, the cap section 102b, the arms 102c, and the lenses 110a-c and 112 define a sensor housing 114 between them. In some embodiments, the cap section 102b may be removeable from the base section 102a to provide access to the sensor housing 114. In addition, the lenses 110a-c may be removable from the lens windows 104a-c to provide further access to the sensor housing 114.

Figure 1B:
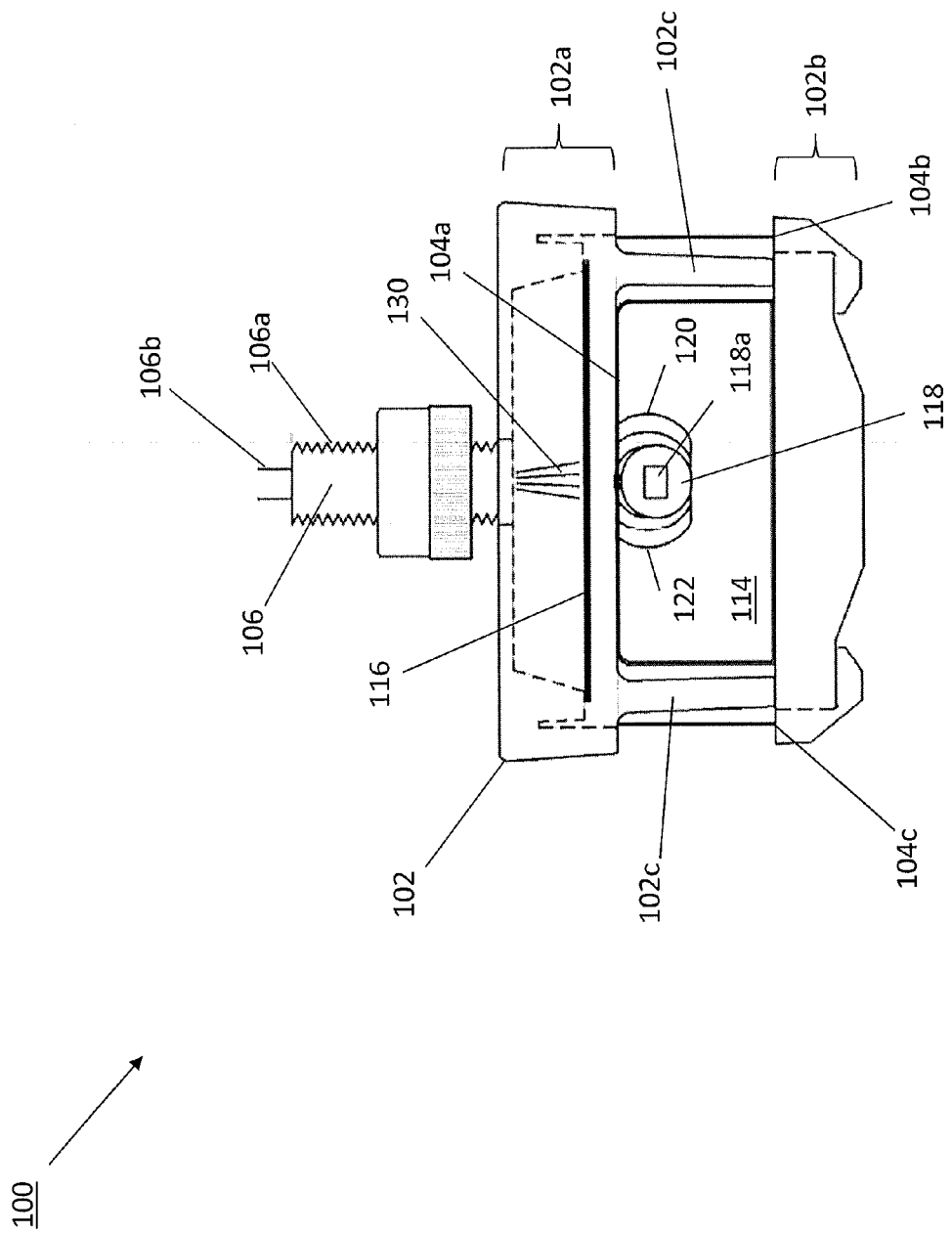
FIG. 1b is a side view illustrating an embodiment of the detection system of FIG. 1a with the lenses removed.
Figure 1D:
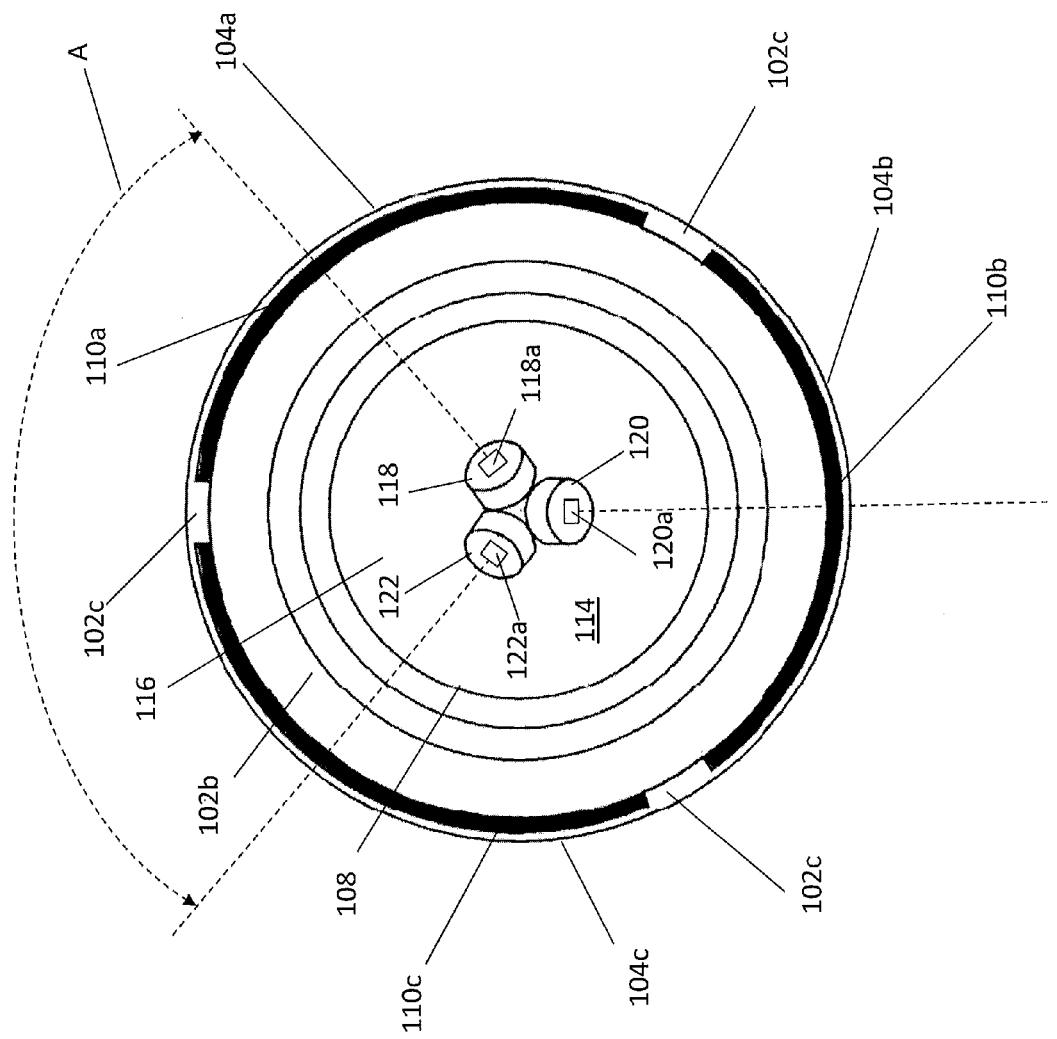
FIG. 1d is a bottom view illustrating an embodiment of the detection system of FIG. 1a with the lens removed.
Figure 1E:
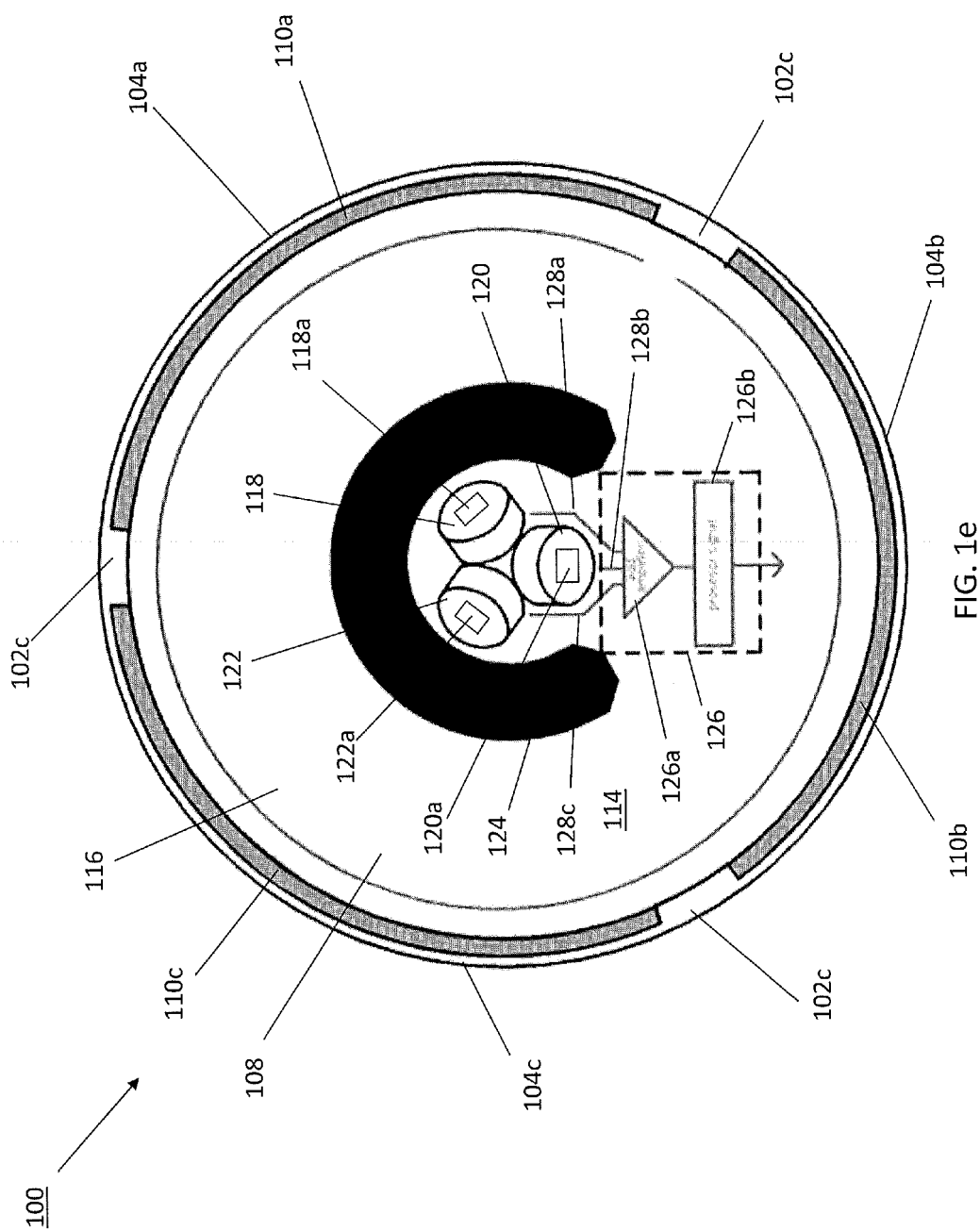

FIGS. 1b, 1d, and 1e illustrate the detection system 100 with the plurality of lenses 110a-c and/or 112 removed from the lens windows 104a-c and/or 108 to provide a view of the contents of the sensor housing 114. As can be seen, a circuit board 116 is coupled to the base section 102a and located in the sensor housing 114. A first sensor device 118 that includes a first sensor 118a is mounted and electrically coupled to the circuit board 116 such that the first sensor 118a on the first sensor device 118 is directed towards the first lens 110a when the first lens 110a is located in the lens window 104a. A second sensor device 120 that includes a second sensor 120a is mounted and electrically coupled to the circuit board 116 such that the second sensor 120a on the second sensor device 120 is directed towards the second lens 110b when the second lens 110b is located in the lens window 104b. A third sensor device 122 that includes a third sensor 122a is mounted and electrically coupled to the circuit board 116 such that the third sensor 122a on the third sensor device 122 is directed towards the third lens 110c when the third lens 110c is located in the lens window 104c. While the embodiment discussed below operates using the three sensor devices 118, 120, and 122 illustrated in FIGS. 1b, 1d, and 1e, some embodiments may include a fourth sensor device added to the sensor array, with a fourth sensor on the fourth sensor device directed towards the fourth lens 112 (e.g., with the fourth sensor device positioned in the area between each of the sensor devices 118, 120, and 122 as illustrated in FIG. 1d.)

In an embodiment, each of the sensor devices 118, 120, and 122 are Passive Infrared (PIR) sensor devices and each of the sensors 118a, 120a, and 122a are FIR sensors that are operable to detect motion by detecting abrupt changes in temperature at a given point by detecting the change in infrared radiation emitted at that point (e.g., a person passing between the PIR sensor and an inanimate object will cause the detected infrared radiation to change based on the change from room temperature of the inanimate object to body temperature of the person.) However, other light or radiation detecting sensors may be used in the systems and methods discussed herein while remaining within the scope of the present disclosure.

As illustrated in FIG. 1d, each of the sensors 118a, 120a, and 122a are oriented at an approximately equal angle relative to its adjacent sensors. For example, angle A between the face of sensor 118a (indicated by a dashed lined extending from the sensor 118a) and the face of sensor 122a (indicated by a dashed line extending from the sensor 122a) is approximately 120 degrees. While not explicitly illustrated, the angle between the faces of sensors 118a and 120a (indicated by the dashed line extending from sensor 120a), as well as the angle between the faces 120a and 122a, are approximately 120 degrees as well. Furthermore, as illustrated in FIG. 1b, each of the sensors 118a, 120a, and 122a may be oriented at an angle to the circuit board 116. For example, each of the sensors 118a, 120a, and 122a may be oriented at an angle to the circuit board 116 of between 15 and 45 degrees. While a few specific orientations of the sensors 118a, 120a, and 122a in the sensor housing have been provided, the orientation of the sensors 118a, 120a, and 122a may change based on the lenses and configuration of the chassis 102 while remaining within the scope of the present disclosure.

FIG. 1e illustrates an embodiment of the circuit board 116 that includes shielded ground protection 124 positioned adjacent to and around each of the sensor devices 118, 120, and 122. A schematic view of a circuitry section 126 on the circuit board 116 is provided that includes an amplifier 126a that is coupled to each of the sensor devices 118, 120, and 122 by respective electrical connections 128a, 128b, and 128c. In an embodiment, the amplifier 126a may be an add amplifier that adds the signals from the sensors 118a, 120a, and 122a to produce a processor signal 126b that may be provided to a processor through wiring 130 in the wire 106b, discussed in further detail below. The circuitry section 126 and/or circuit board 116 may include other components that operate with the amplifier 126a to amplify, filter, and/or otherwise process the signal from the sensor devices 118, 120, and 122 for use in motion detection. In an embodiment, the orientation and positioning of the sensor devices 118, 120, and 122 in the sensor housing 114, along with the orientation and positioning of the lenses 110a, 110b, 110c, and 112, provides the sensors 118a, 120a and 122a in a focal reception area in the sensor housing 114 that minimizes the length of the electrical connections 128a, 128b, and 128c, which provides for reduced electrical noise during the operation of the detection system 100 by reducing the gap between low level signals and the amplifier 126a on the circuit board 116. In addition, the minimization of the length of the electrical connections 128a, 128b, and 128c allows for greater reception sensitivity by reducing the distances between the sensor devices 118, 120, and 122 and the amplifier 126b.

Figure 2:
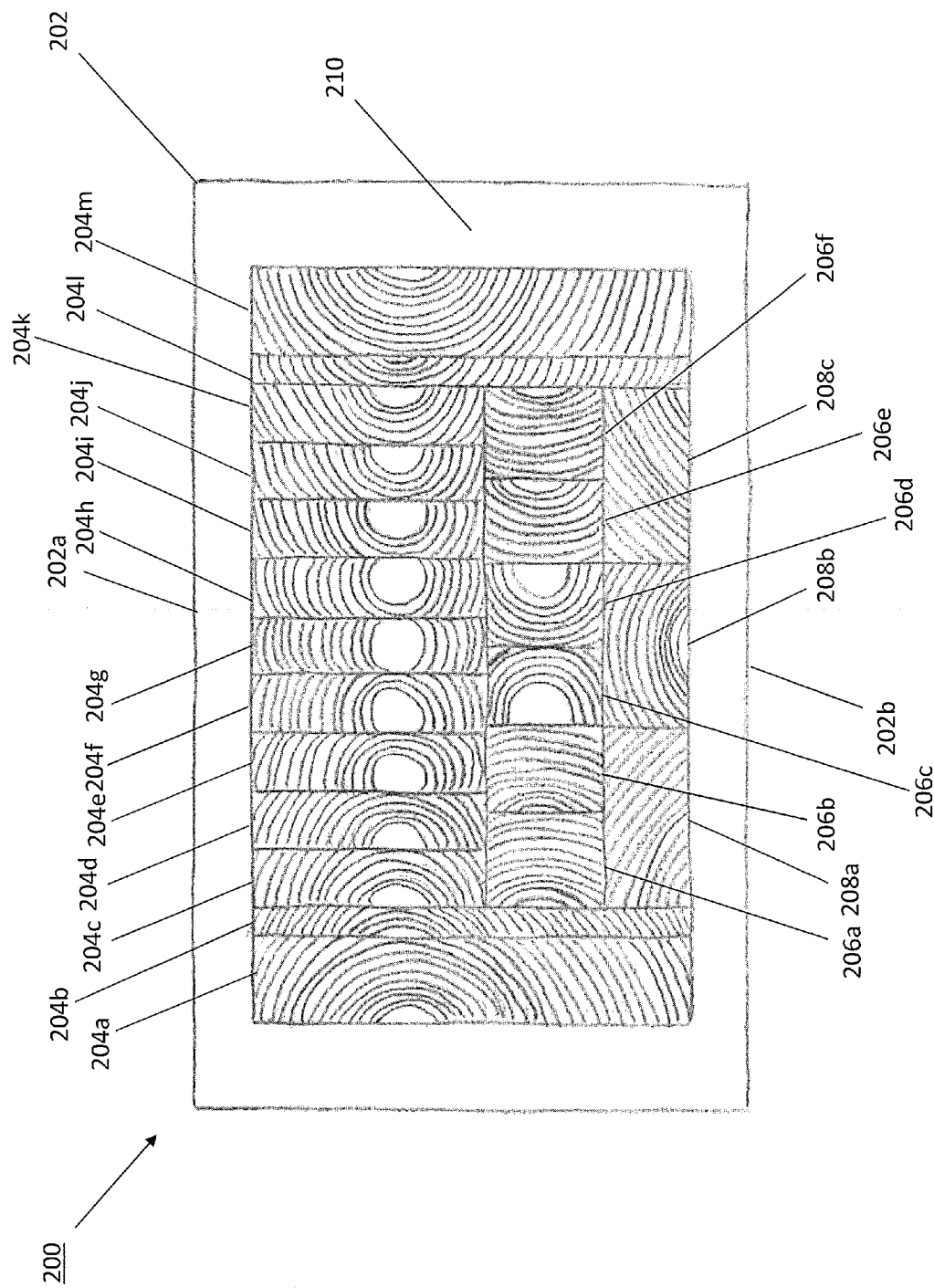
FIG. 2 is a front view illustrating an embodiment of a lens used with the detection system of FIGS. 1a-e.

Referring now to FIG. 2, an embodiment of a lens 200 is illustrated that may be any of the generally rectangular arcuate first lens 110a, the generally rectangular arcuate second lens 110b, and the generally rectangular arcuate third lens 110c discussed above with reference to FIGS. 1a-e. The lens 200 includes a rectangular base 202 that may be manufactured from a plastic or other flexible material that allows the base 202 to be bent into the arcuate shape illustrated in FIGS. 1a, 1c, 1d, and 1e, from a glass material that is shaped arcuately, and/or from a variety of other lens materials known in the art. The base 202 includes a top edge 202a and a bottom edge 202b that is located opposite the base 202 from the top edge 202a. The base 202 also includes a plurality of radiation focusing sections including, in the illustrated embodiment, a plurality of long range radiation focusing sections 204a, 204*b*, 204*c*, 204*d*, 204*e*, 204*f*, 204*g*, 204*h*, 204*i*, 204*j*, 204*k*, 204*l*, and 204*m*; a plurality of intermediate range radiation focusing sections 206*a*, 206, 206*c*, 206*d*, 206*e*, and 206*f*; and a plurality of short range radiation focusing sections 208*a*, 208*b*, and 208*c*. A coupling perimeter area 210 extends around the radiation focusing sections 204*a-m*, 206*a-f*, and 208*a-c*, and may be used to couple the lens 200 to the chassis 102 in each of the lens windows 104*a*, 104*b*, and 104*c* (e.g., the top edge 202*a* may be inserted in a slot in the base section 102*a* of the chassis 102, while the bottom edge 202*b* may be inserted in a slot in the cap section 102*b* of the chassis 102). As can be seen in the illustrated embodiment, each of the radiation focusing sections 204*a-m*, 206*a-f*, and 208*a-c*, includes a radiation focusing pattern that provides for the focusing of radiation from a different area on a first side of the lens 200 and towards a sensor located on a second side of the lens 200 that is opposite the first side, discussed in further detail below.

Figure 3:
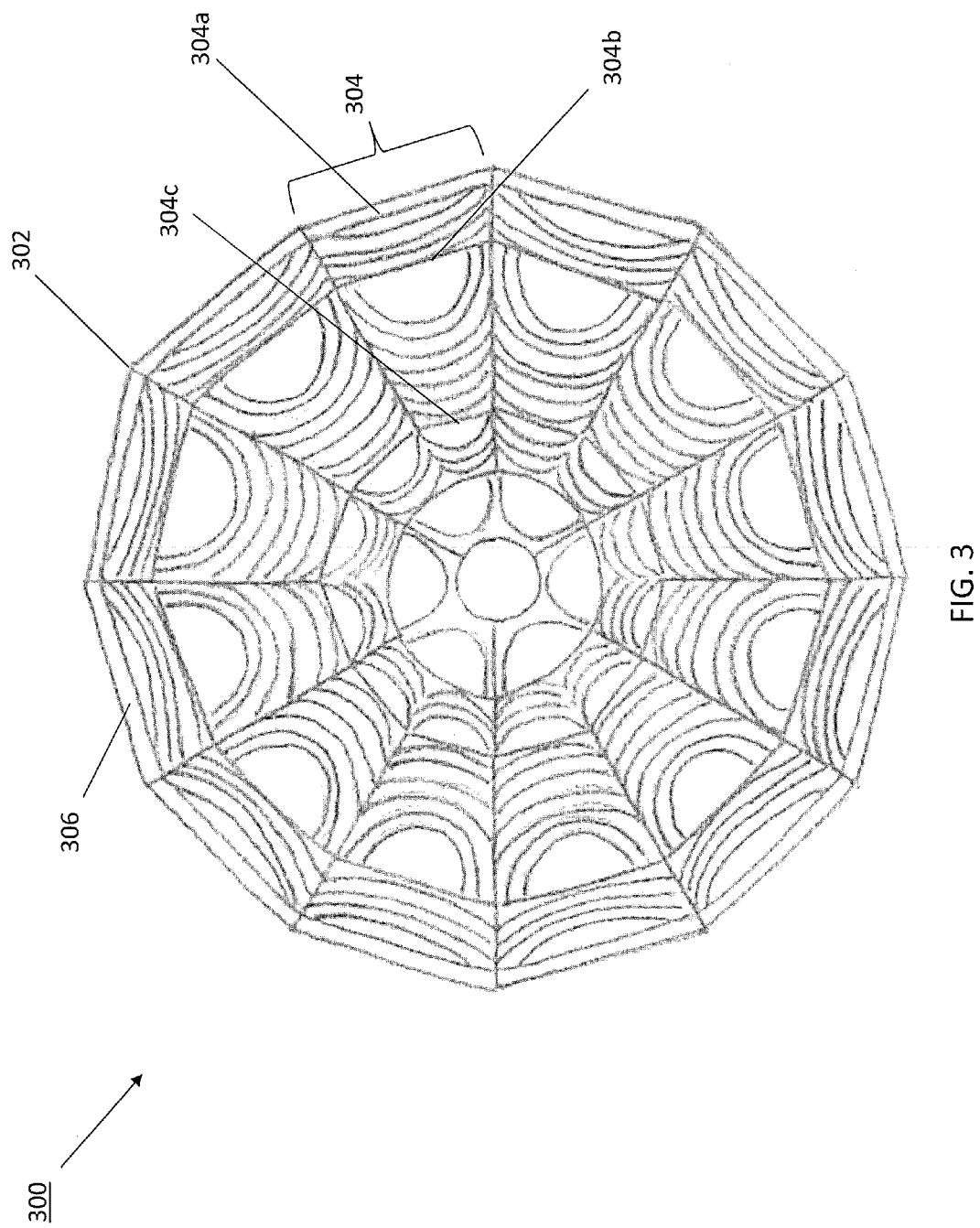
FIG. 3 is a front view illustrating an embodiment of a lens used with the detection system of FIGS. 1a-e.

Referring now to FIG. 3, an embodiment of a lens 300 is illustrated that may be generally concave fourth lens 112 discussed above with reference to FIGS. 1*a-e*. The lens 300 includes a circular and concave base 302 that may be manufactured from a plastic or other flexible material, from a glass material, and/or from a variety of other lens materials known in the art. The base 302 includes a plurality of substantially similar radial sections such as the radial section 304 illustrated in FIG. 3. Each radial section includes a plurality of radiation focusing sections similar to the long range radiation focusing section 304*a* on the radial section 304, the intermediate range radiation focusing sections 304*b* on the radial section 304; and the short range radiation focusing section 304*c* on the radial section 304. A coupling perimeter area 306 extends around the radiation focusing sections on each of the radial sections, and may be used to couple the lens 300 to the chassis 102 in the lens windows 108. As can be seen in the illustrated embodiment, each of the radiation focusing sections (e.g., 304*a*, 304*b*, and 304*c* on the radial section 304 or on the other radial sections) includes a radiation focusing pattern that provides for the focusing of radiation from a different area on a first side of the lens 300 and towards one or more sensors located on a second side of the lens 300 that is opposite the first side, discussed in further detail below.

Figure 4:
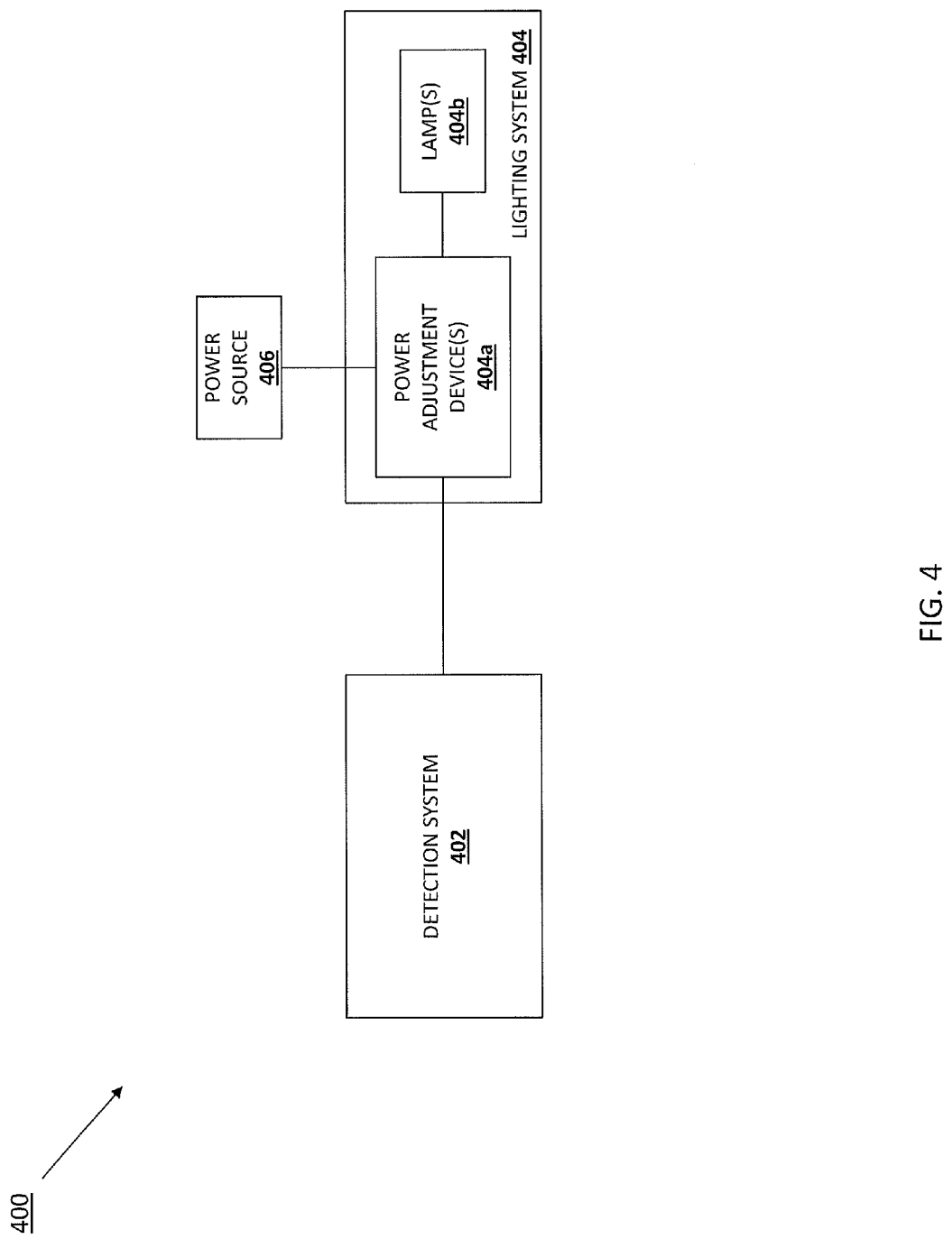
FIG. 4 is a schematic view illustrating an embodiment of a lighting power conservation system.

Referring now to FIG. 4, a lighting power conservation system 400 is illustrated. The lighting power conservation system 400 includes a detection system 402 that may include one or more of the detection systems 100 discussed above with reference to FIG. 1. As discussed below, each detection system 100 in the detection system 402 may be coupled to a ceiling or other support using the connector 106, and the wire 106*b* may be routed to a lighting system 404. The lighting system 404 includes one or more power adjustment devices 404*a* that are coupled to each of the detection system 402, a power source 406, and a one or more lamps 404*b*. In an embodiment, the lighting system 404 may include a dimmable lighting system in which the power adjustment devices 404*a* vary the power from the power source 406 that is supplied to the lamps 404*b* based on the signals provided by the detection system 402 (e.g., the processor signal 126*b* provided from the amplifier 126*a*.) Thus, the power adjustment devices 404*a* may include processing systems, memory systems, and/or circuitry configured to perform the power varying operations discussed above using the processor signal 126*b*. In a specific embodiment, the lighting system 404 is an IntelliDimmer® lighting system available from the assignee of the present disclosure, IntelliSwitch, S.A. de C.V. of Monterey, Mexico. As discussed above, rather than a lighting power conservation system, the detection system described herein may be used in security systems, video systems, and/or a variety of other motion detection scenarios known in the art.

Figure 6A:
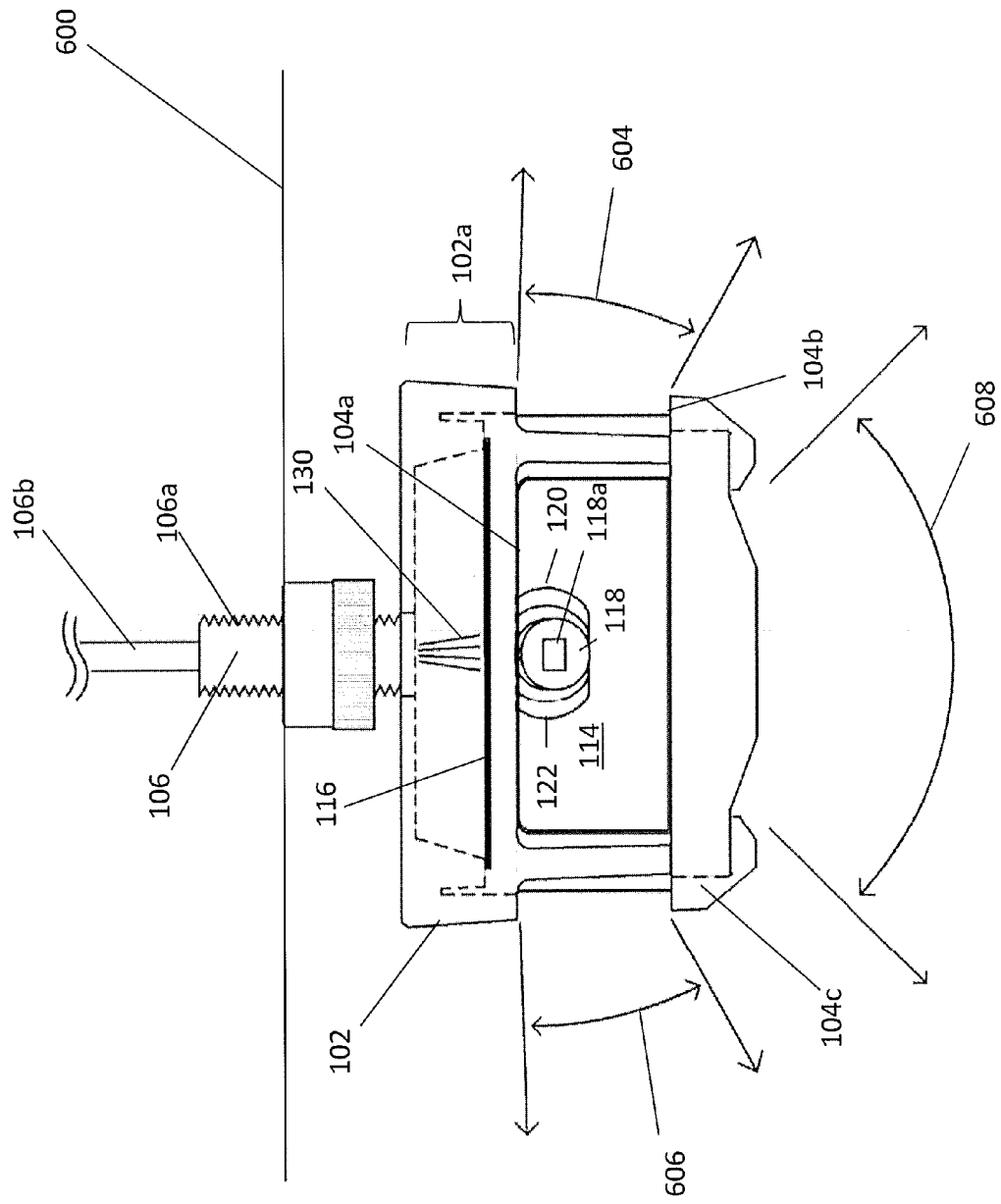
FIG. 6a is a side view illustrating an embodiment of the operation of the detection system of FIGS. 1a-e.

Referring now to FIG. 5, an embodiment of a method 500 for detecting motion is illustrated. The method 500 begins at block 502 where a detection system is coupled to a support. FIG. 6*a* illustrates the detection system 100 discussed above with reference to FIGS. 1*a-e* coupled to a ceiling 600 using the connector 106. For example, the ceiling 600 may include a connector receiver (not illustrated) that provides a threaded cylindrical cavity that accepts the threaded outer surface 106*a* of the connector 106. However, other systems and methods for coupling the detection system 100 to the ceiling 600 will fall within the scope of the present disclosure. In addition to coupling the detection system 100 to the ceiling 600 at block 502, the routing wire 106*b* may be routed through the ceiling 600 to one or more lighting systems such as, for example, the lighting system 404 discussed above with reference to FIG. 4. In experimental embodiments, detections systems in accordance with the present disclosure allow for the mounting of the detection system to ceilings with a height of between 6.5 feet and 13 feet (e.g., where the distance between the ceiling 600 and a floor is between 6.5 feet and 13 feet) while still allowing the full range of motion detection discussed below. However, while the detection system 100 of the present disclosure may be mounted to relatively low ceilings compared to conventional systems) while providing for a desired amount of motion detection, higher mounting heights (e.g., 13 feet and up) will still provide for an increased detection of motion relative to conventional systems and will fall within the scope of the present disclosure. Furthermore, different mounting locations (e.g., a vertical wall, a floor, at an acute angle to the floor, etc.) may provide benefits that will fall within the scope of the present disclosure as well.

Figure 6B:
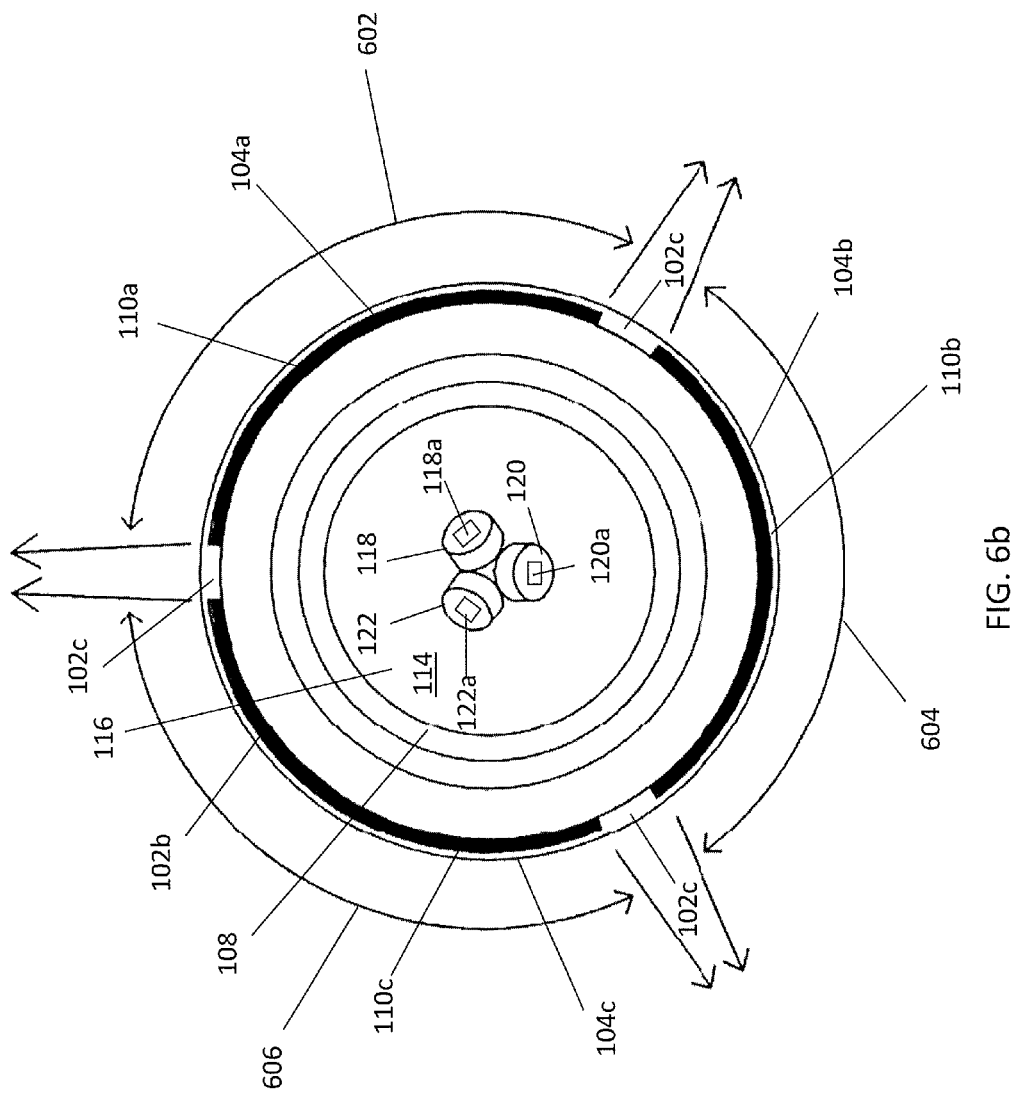
FIG. 6b is a bottom view illustrating an embodiment of the operation of the detection system of FIGS. 1a-e.

The method 500 then proceeds to block 504 where radiation is directed at a first sensor using a first lens, to block 506 where radiation is directed at a second sensor using a second lens, to block 508 where radiation is directed at a third sensor using a third lens, and to block 510 where radiation is directed at least one sensor using a fourth lens, all of which may be performed simultaneously. As discussed in further detail below, in one embodiment, the first sensor 118*a* on the first sensor device 118, the second sensor 120*a* on the second sensor device 120, and the third sensor 122*a* on the third sensor device 122 operate with the lenses 110*a*, 110*b*, 110*c* and 112 to provide 360 degrees of motion detection about a horizontal plane as well as to provide 180 degrees of motion detection below that horizontal plane. Referring to both FIGS. 6*a* and 6*b*, embodiments of detection angles are illustrated for the detection system 100 that provide an example of the angle from which radiation (e.g., infrared emissions) from outside the detection system 100 (e.g., outside the chassis 102 and lenses 110*a-c* and 112) may be directed by towards the sensors 118*a*, 120*a*, and 122*a* on the sensor devices 118, 120, and 122 to provide for motion detection. However, while specific examples are provided, one of skill in the art in possession of the present disclosure will recognize how the positioning and/or orientation of the sensor devices and sensors, as well that he positioning, orientation, and/or details of the radiation focusing sections on the lenses may be modified to adjust the detection angles as desired.

A first detection angle 602 is associated with the first sensor device 118, the first sensor 118*a*, and the first lens 110*a*, and is provided by the first lens 110*a* directing radiation from outside the chassis 102 of the detection system 100 and towards the first sensor 118*a*. A second detection angle 604 is associated with the second sensor device 120, the second sensor 120*a*, and the second lens 110*b*, and is provided by the second lens 110b directing radiation from outside the chassis 102 of the detection system 100 and towards the second sensor 120a. A third detection angle 606 is associated with the third sensor device 122, the third sensor 122a, and the third lens 110c, and is provided by the third lens 110c directing radiation from outside the chassis 102 of the detection system 100 and towards the third sensor 122a. Furthermore, in the embodiment discussed below, a fourth detection angle 608 is associated with each of the first sensor device 118/first sensor 118a, the second sensor device 120/second sensor 120a, the third sensor device 122/third sensor 122a, and the fourth lens 112, and is provided by the fourth lens 112 directing radiation from outside the chassis 102 of the detection system 100 and towards the first sensor 118a, the second sensor 120a, and the third sensor 122a. However, as discussed above, a fourth sensor device with a fourth sensor may be provided in the sensor housing 114 and directed toward the fourth lens 112 such that the fourth lens 112 directs radiation from outside the chassis 102 of the detection system 100 and towards the fourth sensor. In the illustrated embodiment, each of the detection angles 602, 604, and 606 are substantially equal and may be provided by, for example, substantially similar lenses in the lens windows 104a, 104b, and 104c and/or substantially similar sensor device/sensor positioning and/or orientation. In an embodiment, each of the detection angles 602, 604, and 606 is at least 120 degrees as viewed in FIG. 6b, providing for 360 degrees of horizontal motion detection by the detection system 100.

Figure 7A:
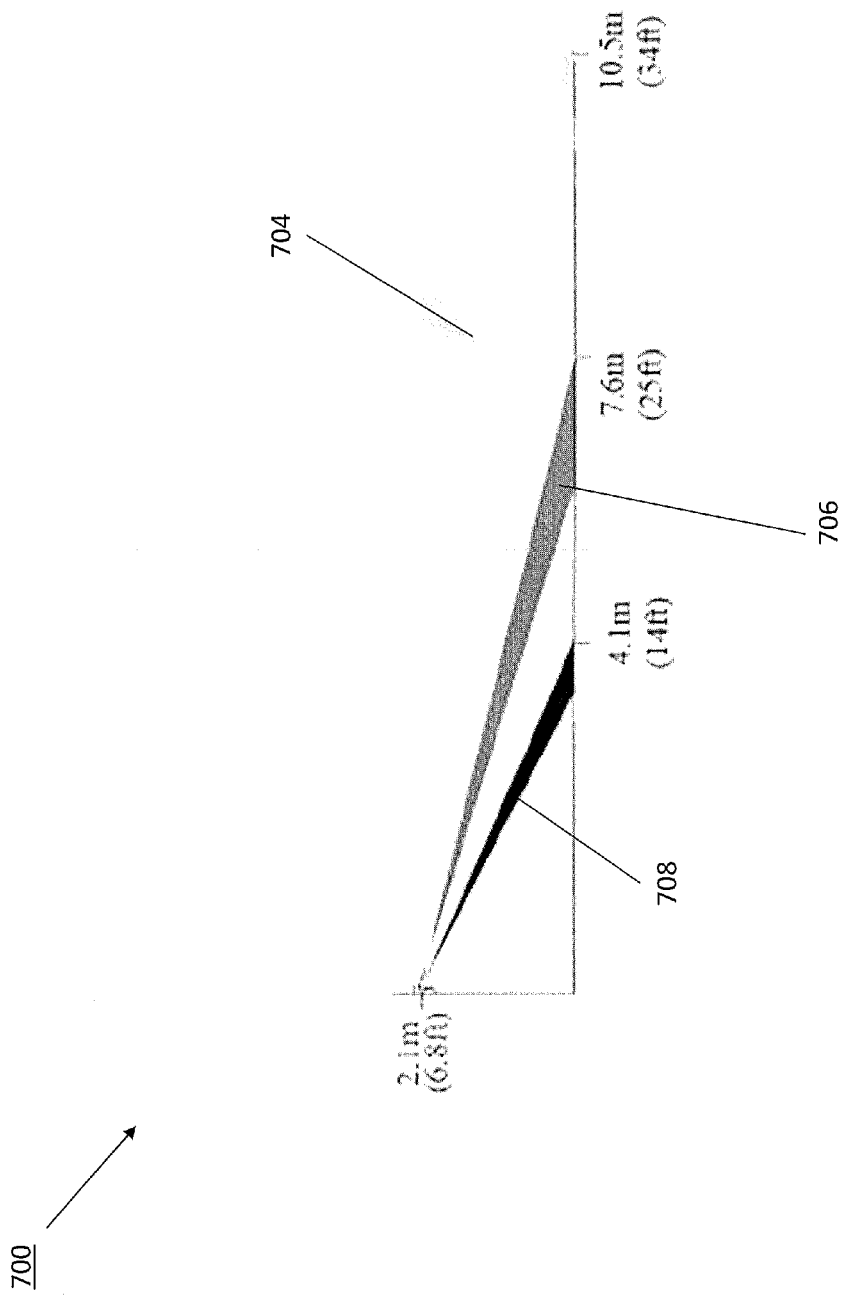
FIG. 7a is a graph view illustrating an embodiment of a horizontal detection coverage area for the detection system of FIGS. 1a-e from a side view.
Figure 7B:
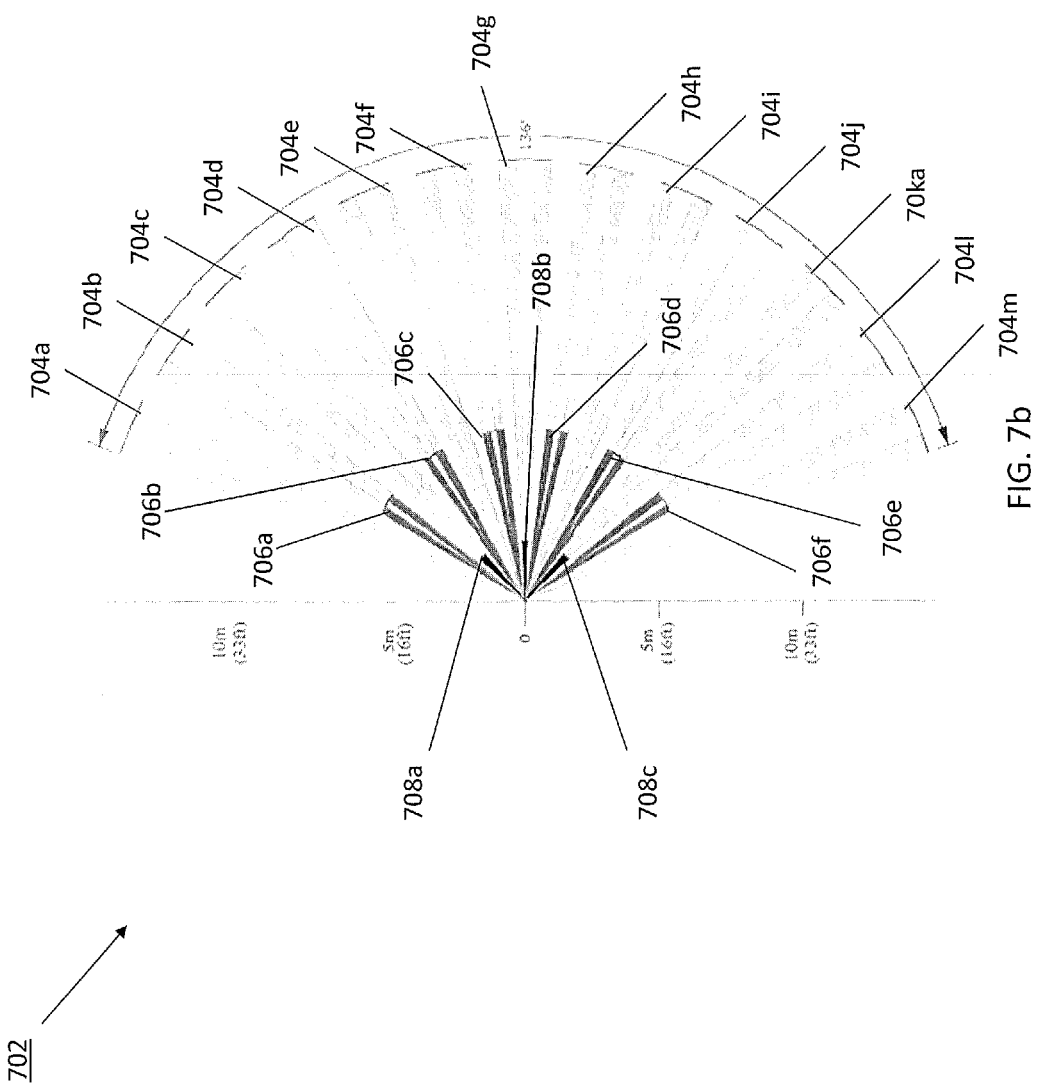
FIG. 7b is a graph view illustrating an embodiment of a horizontal detection coverage area for the detection system of FIGS. 1a-e from a top view.

Referring now to FIGS. 7a and 7b, an example of the detection angles 602, 604, and 606 provided using the lens 200 is illustrated. FIGS. 7a and 7b illustrate a side view graph 700 and a top view graph 702 of an embodiment in which the detection system 100 is mounted to a support at a height of approximately 6.8 feet/2.1 meters. With reference to the lens 200 discussed above with regard to FIG. 2, the side view graph 700 and the top view graph 702 illustrate a plurality of long range radiation detection zones 704a, 704b, 704c, 704d, 704e, 704f, 704g, 704h, 704i, 704j, 704k, 70841, and 704m that are provided by respective long range radiation focusing sections 204a-m on the lens 200; a plurality of intermediate range radiation detection zones 706a, 706b, 706c, 706d, 706e, and 706g that are provided by respective intermediate range radiation focusing sections 206a-f; and a plurality of short range radiation detection zones 708a, 708b, and 708c that are provided by respective short range radiation focusing sections 208a-c. In an embodiment, each radiation focusing pattern on the radiation focusing sections provides for the focusing of radiation from a different area in front of the lens 200 and towards a sensor such that the respective radiation detection zone is provided. For example, the long range radiation focusing section 204e on the lens 200 includes a radiation focusing pattern that provides the radiation detection zone 704e.

As can be seen in the illustrated example, the lens 200 provides long range radiation detections zones 704a-m that together cover an angle of 136 degrees in front of that sensor (illustrated by the top view in FIG. 7b), with each detection zone 704 extending between a horizontal plane (extending through the detection system 100 and parallel to the floor) and a distance of approximately 34 feet/10.5 meters from a point on the floor that is immediately underneath the detection system 100. Thus, radiation from outside the chassis 102 of the detection system 100 (opposite the lenses 110a, 110b, and 110c from the sensor housing 114) that originates from a direction that is perpendicular to the lenses 110a, 110b, and 110c (e.g., along the horizontal plane) will be directed towards the sensors 118a, 120a, and 122a, respectively, such that the 360 degrees of horizontal motion detection is enabled. Furthermore, the lens 200 provides intermediate range radiation detections zones that each extend between a distance of approximately 25 feet/7.6 meters and approximately 20 feet/6 meters from a point on the floor that is immediately underneath the detection system 100. Further still, the lens 200 provides short range radiation detections zones that each extend between a distance of approximately 14 feet/4.1 meters and approximately 11.5 feet/3.5 meters from a point on the floor that is immediately underneath the detection system 100. Thus, with the lens 200 provided as the lenses 110a, 110b, and 110c in the detection system 100, blocks 504, 506, and 508 of the method 500 are performed to provide 360 degrees of horizontal detection using the sensors 118a, 120a, and 122a. In an embodiment, at blocks 504, 506, and 508, changes in radiation focused on the sensors 118a 120a, and 122a may result in signals being sent from the sensor 118a, 120a, and/or 122a to the power adjustment device(s) 404a in the lighting system 404 of FIG. 4 to cause the adjustment of power to the lamp(s) 404b. While the embodiment of FIG. 7b illustrates a 136 degree range of long range radiation detection from one of the lenses 110a, 110b, and 110c, embodiments where the long range radiation detection for each lens 110a, 110b, and 110c covers a range of 160 degrees are envisioned. By providing a range of radiation detection greater than 120 degrees for each of the lenses 110a, 110b, and 110c, overlap is provided at the edges of the detection range of each sensor 118a, 120a, and 122a for increased detection capability at those detection range edges.

Figure 8:
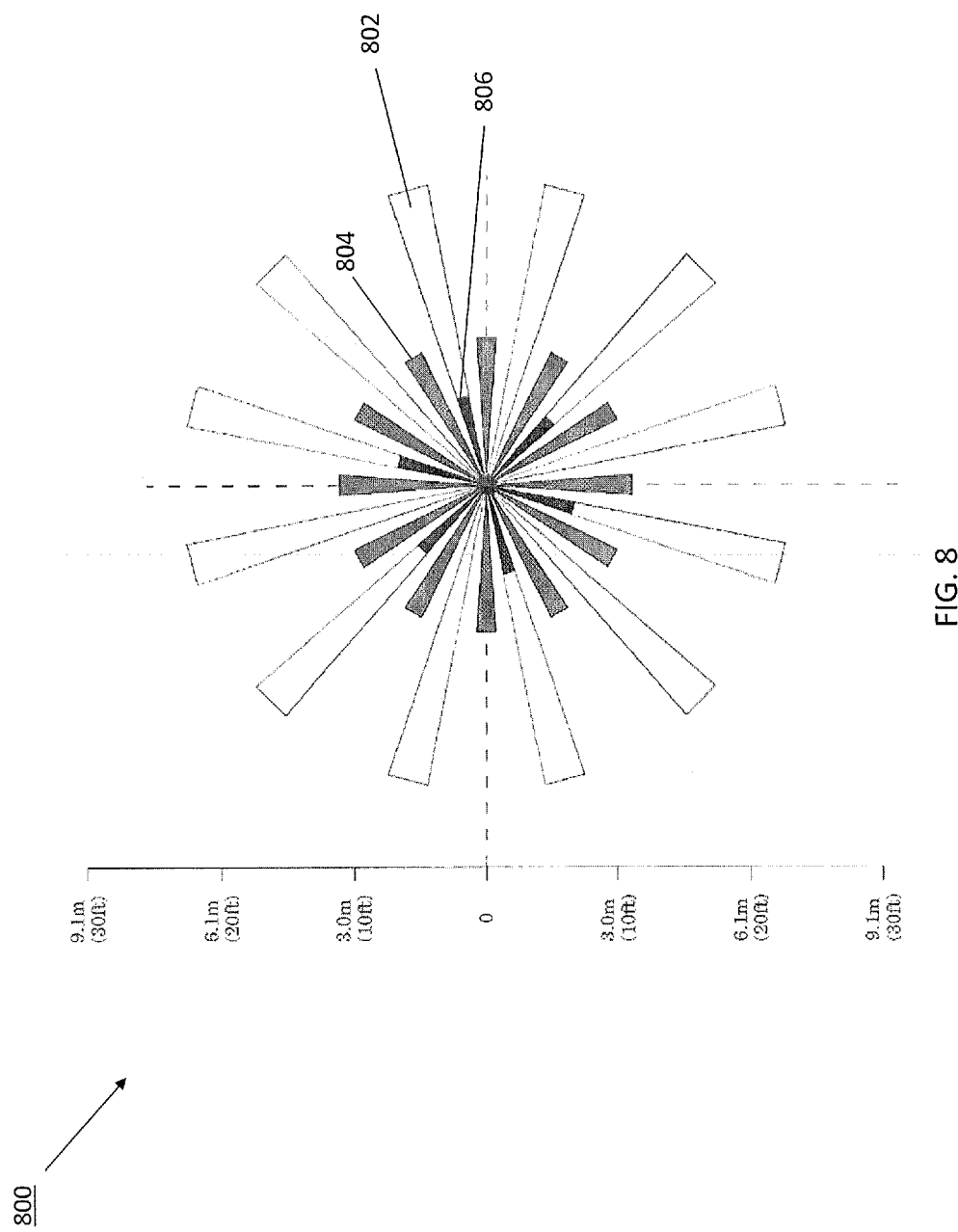
FIG. 8 is a graph view illustrating an embodiment of a vertical detection coverage area for the detection system of FIGS. 1a-e from a top view.

Referring now to FIG. 8, an example of the detection angle 608 provided using the lens 300 is illustrated. FIG. 8 illustrates a top view graph 800 of an embodiment in which the detection system 100 is mounted to a support at a height of approximately 8 feet/2.4 meters. With reference to the lens 300 discussed above with regard to FIG. 3, the top view graph 800 illustrate a plurality of long range radiation detection zones 802 that are provided by respective long range radiation focusing sections similar to the long range radiation focusing section 304a on the radial section 304 on the lens 300; a plurality of intermediate range radiation detection zones 804 that are provided by respective intermediate range radiation focusing sections similar to the intermediate range radiation focusing section 304b on the radial section 304 on the lens 300; and a plurality of short range radiation detection zones 806 that are provided by respective short range radiation focusing sections similar to the short range radiation focusing section 304c on the radial section 304 on the lens 300. In an embodiment, each radiation focusing pattern on the radiation focusing sections provides for the focusing of radiation from a different area in front of the lens 300 and towards a sensor such that the respective radiation detection zone is provided. For example, the long range radiation focusing section 304a on the radial section 304 of the lens 300 includes a radiation focusing pattern that provides the radiation detection zone 802.

Figure 9:
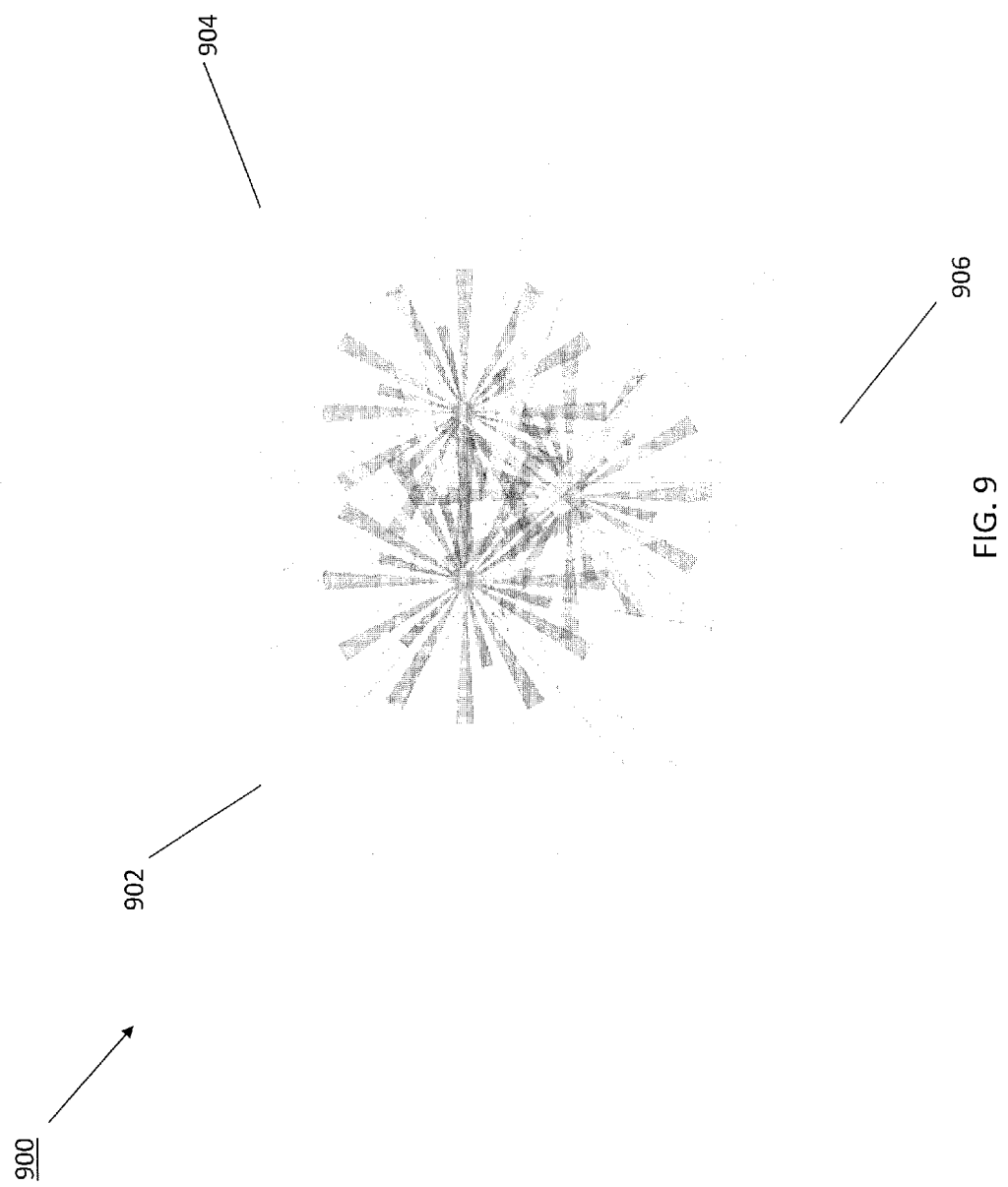
FIG. 9 is a graph view illustrating an embodiment of a vertical detection coverage area for the detection system of FIGS. 1a-e from a top view.

The top view graph 800 of FIG. 8 illustrates a plurality of radiation detection zones that provide a radiation detection pattern for a single sensor. In other words, the radiation detection pattern than includes the plurality of long range radiation detection zones 802, the intermediate range radiation detection zones 804, and the short range radiation detection zones 806, is a radiation detection pattern for a single sensor (e.g., the first sensor 118a in the first sensor device 118) that is provided by the operation of the lens 112 and that sensor. However, the positioning and orientation of the first sensor device 118/first sensor 118a, the second sensor device 120/ second sensor 120a, and the third sensor device 122/third sensor 122a, provides for multiple similar overlaid radiation detection patterns. For example, FIG. 9 illustrates top view of an overlaid radiation detection pattern 900 that includes a first radiation detection pattern 902, a second radiation detection pattern 904, and a third radiation detection pattern 906, each of which is substantially similar to the radiation detection pattern illustrated in FIG. 8 and discussed above. One of skill in the art in possession of the present disclosure will recognize that the combination of the overlaid radiation detection pattern 900 of FIG. 9 and the radiation detection illustrated in FIGS. 7a and 7b provide for 180 degrees of motion protection beneath a horizontal plane that includes the detection system 100 (and about which 360 degrees of radiation detection is provided by the detection system as discussed above.)

Figure 10:
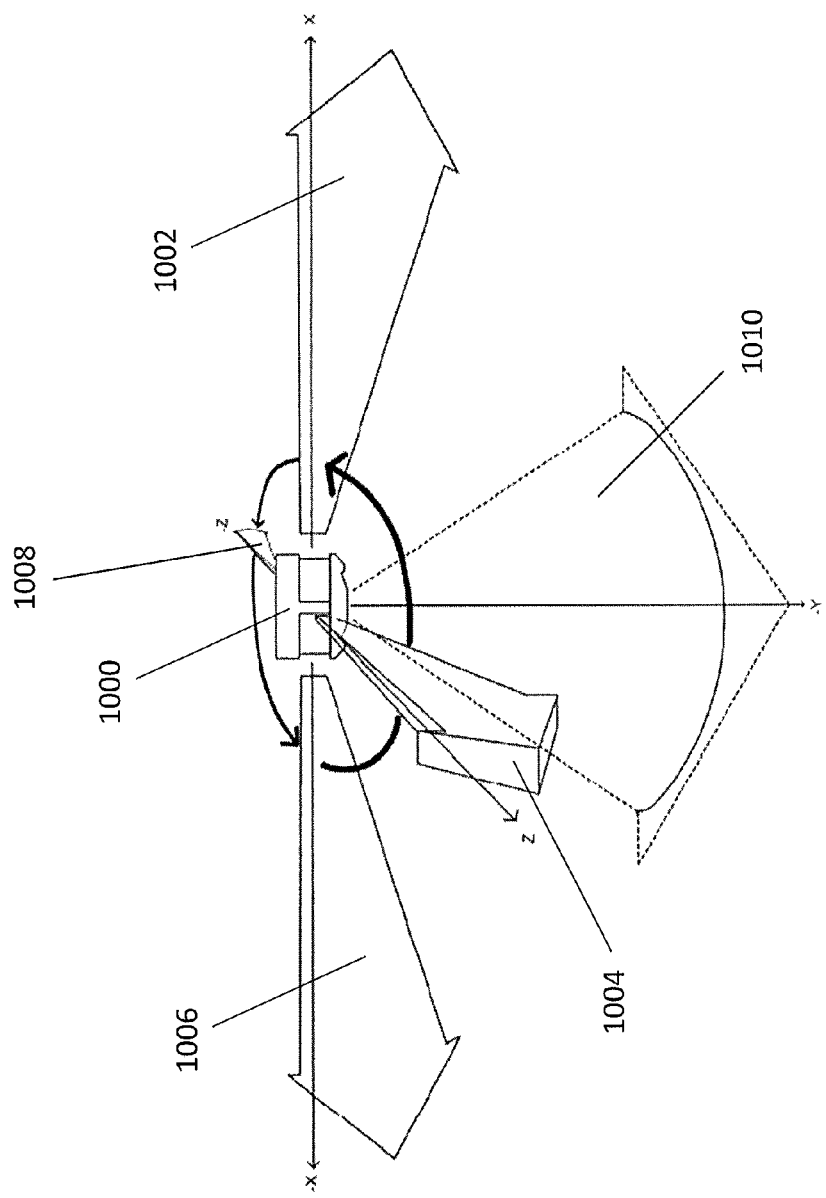
FIG. 10 is a perspective view illustrating an embodiment of the operation of the detection system of FIGS. 1a-e.

Thus, systems and methods for detecting motion have been described that provide for more complete motion detection coverage of an area compared to conventional detection systems using a single detection system. FIG. 10 illustrates a schematic view of an embodiment of such a single detection system 1000, which may be the detection system 100 discussed above with reference to FIGS. 1a-e, operating according to the teachings of the present disclosure to provide 360 degrees of horizontal coverage, as illustrated by the radiation detection zones 1004, 1006, 1008, and 1010 that extend around the plane that includes the x axis, −x axis, z axis, and −z axis, as well as 180 degrees of vertical coverage beneath the detection system 100, as illustrated by the radiation detection zones 1004, 1006, 1008, 1010, and 1012. Thus, a single detection system may replace multiple conventional detection systems while providing the same areas or zones of motion detection, reducing cost and the need to install, operate, and maintain a plurality of detection systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A detection system, comprising:
a chassis;
at least three sensors housed in the chassis;
a first lens coupled to the chassis and configured to direct radiation from outside the chassis towards a first sensor of the at least three sensors over a first horizontal coverage angle of at least 120 degrees;
a second lens coupled to the chassis and configured direct radiation from outside the chassis towards a second sensor of the at least three sensors over a second horizontal coverage angle of at least 120 degrees that is different from the first horizontal coverage angle; and
a third lens coupled to the chassis and configured direct radiation from outside the chassis towards a third sensor of the at least three sensors over a third horizontal coverage angle of at least 120 degrees that is different from the first horizontal coverage angle and the second horizontal coverage angle;
wherein the first horizontal coverage angle, the second horizontal coverage angle, and the third horizontal coverage angle provide for 360 degrees of radiation detection on a horizontal plane that passes through the chassis.

2. The detection system of claim 1, further comprising:
a fourth lens coupled to the chassis and oriented substantially perpendicularly to the first lens, the second lens, and the third lens, wherein the fourth lens is configured to direct radiation from outside the chassis towards at least one of the at least three sensors over a vertical coverage angle of at least 120 degrees.

3. The detection system of claim 1, wherein each of the first lens, the second lens, and third lens include a plurality of radiation focusing sections, and wherein each radiation focusing section is configured to direct radiation from outside the chassis towards one of the at least three sensors.

4. The detection system of claim 1, further comprising:
a circuit board including an amplifier and providing electrical connections between the amplifier and the at least three sensors, wherein each of the at least three sensors are located in a focal reception area in the chassis that minimizes the length of the electrical connections between the at least three sensors and the amplifier.

5. The detection system of claim 1, wherein:
the first lens is configured such that radiation from outside the chassis that originates from a direction that is perpendicular to the first lens is received by the first sensor over the first horizontal coverage angle of at least 120 degrees;
the second lens is configured such that radiation from outside the chassis that originates from a direction that is perpendicular to the second lens is received by the second sensor over the second horizontal coverage angle of at least 120 degrees that is different from the first horizontal coverage angle; and
the third lens is configured such that radiation from outside the chassis that originates from a direction that is perpendicular to the third lens is received by the third sensor over the third horizontal coverage angle of at least 120 degrees that is different from the first horizontal coverage angle and the second horizontal coverage angle.

6. The detection system of claim 1, wherein the first sensor is oriented at a 120 degree angle relative to each of the second sensor and the third sensor, the second sensor is oriented at a 120 degree angle relative to each of the first sensor and the third sensor, and the third sensor is oriented at a 120 degree angle relative to each of the first sensor and the second sensor.

7. The detection system of claim 1, further comprising:
a ceiling connector extending from the chassis and configured to couple the chassis to a ceiling such that each of the first lens, the second lens, and the third lens is orientated substantially perpendicular to the ceiling and the horizontal plane is parallel to the ceiling.

8. A lighting power conservation system, comprising:
a lighting system including at least one lamp and a power adjustment device coupled to the at least one lamp that is operable to vary the power supplied to the at least one lamp; and
a detection system coupled to the power adjustment system and configured to provide detection signals to the power adjustment system for use in varying the power supplied to the at least one lamp, wherein the detection system includes:
a chassis;
at least three sensors that are housed in the chassis and that are each operable to generate detection signals;
a first lens coupled to the chassis and configured to direct radiation from outside the chassis towards a first sensor of the at least three sensors over a first horizontal coverage angle of at least 120 degrees;
a second lens coupled to the chassis and configured direct radiation from outside the chassis towards a second sensor of the at least three sensors over a second horizontal coverage angle of at least 120 degrees that is different from the first horizontal coverage angle; and a third lens coupled to the chassis and configured direct radiation from outside the chassis towards a third sensor of the at least three sensors over a third horizontal coverage angle of at least 120 degrees that is different from the first horizontal coverage angle and the second horizontal coverage angle;

wherein the first horizontal coverage angle, the second horizontal coverage angle, and the third horizontal coverage angle provide for 360 degrees of radiation detection on a horizontal plane that passes through the chassis.

9. The lighting power conservation system of claim 8, further comprising:

a fourth lens coupled to the chassis and oriented substantially perpendicularly to the first lens, the second lens, and the third lens, wherein the fourth lens is configured to direct radiation from outside the chassis towards at least one of the at least three sensors over a vertical coverage angle of at least 120 degrees.

10. The lighting power conservation system of claim 8, wherein each of the first lens, the second lens, and third lens include a plurality of radiation focusing sections, and wherein each radiation focusing section is configured to direct radiation from outside the chassis towards one of the at least three sensors.

11. The lighting power conservation system of claim 8, further comprising:

a circuit board including an amplifier and providing electrical connections between the amplifier and the at least three sensors, wherein each of the at least three sensors are located in a focal reception area in the chassis that minimizes the length of the electrical connections between the at least three sensors and the amplifier.

12. The lighting power conservation system of claim 8, wherein:

the first lens is configured such that radiation from outside the chassis that originates from a direction that is perpendicular to the first lens is received by the first sensor over the first horizontal coverage angle of at least 120 degrees;

the second lens is configured such that radiation from outside the chassis that originates from a direction that is perpendicular to the second lens is received by the second sensor over the second horizontal coverage angle of at least 120 degrees that is different from the first horizontal coverage angle; and the third lens is configured such that radiation from outside the chassis that originates from a direction that is perpendicular to the third lens is received by the third sensor over the third horizontal coverage angle of at least 120 degrees that is different from the first horizontal coverage angle and the second horizontal coverage angle.

13. The lighting power conservation system of claim 8, wherein the first sensor is oriented at a 120 degree angle relative to each of the second sensor and the third sensor, the second sensor is oriented at a 120 degree angle relative to each of the first sensor and the third sensor, and the third sensor is oriented at a 120 degree angle relative to each of the first sensor and the second sensor.

14. The lighting power conservation system of claim 8, further comprising:

a ceiling connector extending from the chassis and configured to couple the chassis to a ceiling such that each of the first lens, the second lens, and the third lens is orientated substantially perpendicular to the ceiling and the horizontal plane is parallel to the ceiling.

* * * * *